United States Patent [19]

Kennedy et al.

[11] Patent Number: 5,115,462
[45] Date of Patent: May 19, 1992

[54] REMOTELY CONTROLLED APPARATUS FOR CONDITIONING TELEPHONE LINE EXCLUSIVE OF METALLIC DC BYPASS PAIR

[75] Inventors: Michael Kennedy, Ventura; Ben Pierce, Camarillo; Aaron Chan, Moorpark, all of Calif.

[73] Assignee: Harris Corporation, Melbourne, Fla.

[21] Appl. No.: 679,934

[22] Filed: Apr. 3, 1991

[51] Int. Cl.⁵ .................... H04M 3/30; H04B 3/46
[52] U.S. Cl. .................................................. 379/29
[58] Field of Search .................. 379/29, 21, 22, 27

[56] References Cited

U.S. PATENT DOCUMENTS 4,937,851 6/1990 Lynch et al. .................. 379/27
4,943,993 7/1990 Fore ................................ 379/29

Primary Examiner—Stafford D. Schreyer
Attorney, Agent, or Firm—Evenson, Wands, Edwards, Lenahan & McKeown

[57] ABSTRACT

A remotely controlled line conditioning apparatus is installed in the terminal where access to the telephone loop to be tested is readily available. Although a metallic bypass pair from the central office to the (remote) terminal may also be available, its presence and/or condition does not affect the ability of the apparatus to condition the line under test. The line conditioning apparatus includes a telephone line termination unit and an intelligent control unit. The telephone line termination unit has a telephone line access port to which a telephone line pair is selectively coupled, and is operative to controllably impart a selected one of a plurality of electrical signalling conditions to the telephone line pair under test. The control unit has a communication modem through which communication signals containing telephone line conditioning messages are coupled to and from the central office/remote terminal communication link. The control unit also includes a micro-controller, which is coupled to the modem, for generating telephone line unit control signals in response to line conditioning messages from a host unit located at the central office. Control signals generated by the micro-controller control the operation of the telephone line termination unit which conditions the telephone line pair.

19 Claims, 5 Drawing Sheets

REMOTELY CONTROLLED APPARATUS FOR CONDITIONING TELEPHONE LINE EXCLUSIVE OF METALLIC DC BYPASS PAIR

FIELD OF THE INVENTION

The present invention relates in general to telecommunications systems and is particularly directed to an apparatus, installed in a remote terminal, for conditioning a telephone line pair under the control of a direct access test unit located in the central office, and exclusive of the use of a metallic DC bypass pair normally provided for the purpose.

BACKGROUND OF THE INVENTION

The proliferation of carrier system service throughout the telecommunications industry has mandated the need for testing and conditioning an ever increasing number of telephone lines of digital loop carrier or pair gain systems. Traditionally, such testing has been carried out by means of a metallic DC bypass pair, which extends from the central office terminal to the remote terminal where access to the telephone lines of interest is provided. Equipment installed at the central office transmits test condition signals over the DC bypass pair to the remote terminal and subsequently to the line under test (LUT).

Unfortunately, this test and conditioning scheme suffers from a number of shortcomings including the fact that, in may cases, the test results represent not only conditions and faults on the line (loop) being tested, but also those of the DC bypass pair, which is connected in series with the LUT. Consequently, fault conditions such as noise, crosstalk, unacceptable voltage levels, etc. on the DC bypass pair manifest themselves by way of inaccurate results in the course of evaluating the LUT.

Another problem is the fact that such test systems suffer from an inherent functional limit of approximately 2800 ohms (roughly ten miles of copper wire), beyond which point line testing is generally considered to be unreliable. Thus, the effective reach of a conventional telephone line test system is limited by the distance between the central office and the remote terminal. Indeed, in many instances this distance is so great as to preclude the use of a centralized test system which utilizes the DC bypass metallic pair for loop carrier applications. Moreover, with the advent and proliferation of optical fiber as a communication link for voice and data traffic between the central office and the remote terminal, it can be seen that the ability to use a metallic bypass pair for test purposes is becoming more limited. In some cases metallic bypass pairs are not even included with fiber optic installations, making the use of a conventional centralized test system virtually impossible.

SUMMARY OF THE INVENTION

In accordance with the present invention, the above-described problems of conventional centralized test systems are effectively obviated by a remotely controlled line conditioning apparatus that is installed in the terminal where access to the telephone loop to be tested is readily available. Although a metallic bypass pair from the central office to the (remote) terminal may also be available, its presence and/or condition does not affect the ability of the apparatus to condition the LUT.

To this end, the telephone line conditioning apparatus of the present invention includes a telephone line termination unit and an intelligent control unit. The telephone line termination unit has a telephone line access port to which a telephone line pair is selectively coupled, and is operative to controllably impart a selected one of a plurality of electrical signalling conditions to the telephone line pair under test. The control unit has a communication modem through which communication signals containing telephone line conditioning messages are coupled to a channel unit in the remote terminal, the channel unit being coupled with the central office/remote terminal communication link. The control unit also includes a micro-controller, which is coupled to the modem, for generating telephone line unit control signals in response to line conditioning messages from a host unit located at the central office. Preferably, the central office-resident host system is a direct access test unit of the type described in U.S. Pat. No. 4,841,560, assigned to the assignee of the present application and the disclosure of which is herein incorporated. Control signals generated by the micro-controller control the operation of the telephone line termination unit which conditions the telephone line pair.

The telephone line termination unit preferably comprises a telephone line condition selection circuit which contains a plurality of switching devices (relays) coupled to receive respectively different telephone line condition-representative inputs. The relays are selectively controlled by control signals from the control processor to impart a selected telephone line condition to a respective telephone line pair. The selected telephone line condition may involve the application of prescribed voltages to the telephone line pair, or the application of predetermined tone signals to either or both lines of said telephone line pair. It may also include shorting the telephone line pair together, shorting either or both sides of the line to ground potential, opening the telephone line pair, and the monitoring of the telephone line pair for the presence of voice or data activity.

Because of its intelligent control functionality and its ability to exchange line conditioning messages with the host system, the telephone line conditioning apparatus of the present invention has the ability to perform a variety of software-driven operations. For example, the telephone line conditioning apparatus of the present invention may be equipped with the ability to perform a line conditioning function as specified by the host system for an extended period of time, as determined by the user of the host equipment. In such a case, after the connection between the host and the remote terminal has been released, the apparatus of the present invention may perform specified conditioning of the line pair and make its modem access port available for further messages from the host. While maintaining the specified line conditioning function, the invention may be accessed by the host and may permit any line conditioning function to be performed including cancellation of the particular function being maintained. In addition, each time a line conditioning function is invoked, a verification test may be carried out in order to assess the apparatus' current capacity to provide the specified conditioning function.

DETAILED DESCRIPTION

Figure 1:
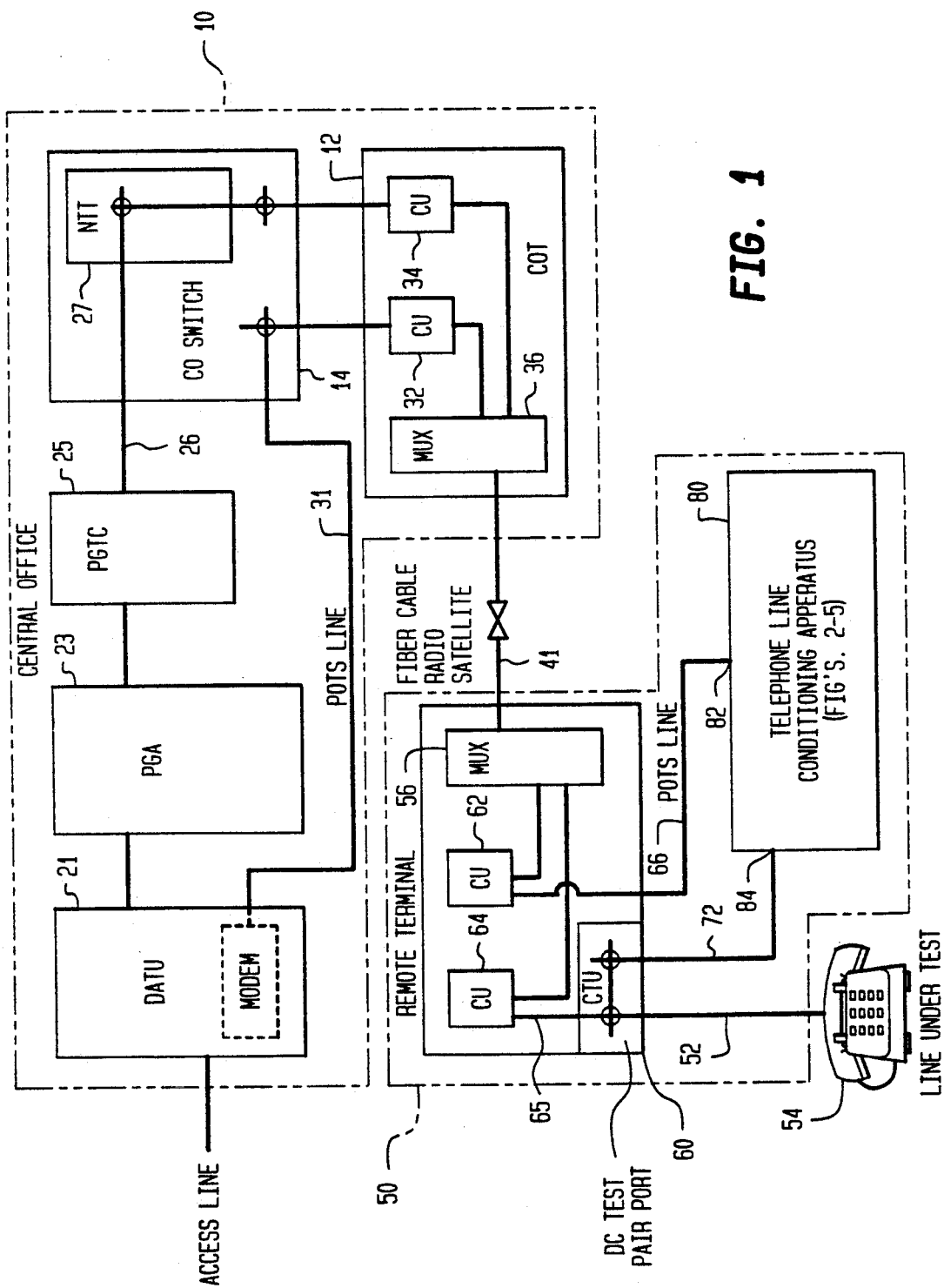
FIG. 1 diagrammatically illustrates a simplified example of a representative carrier telephone network with which the remotely controlled telephone line condition- FIG. 2 diagrammatically shows the general configuration of the telephone line termination apparatus of the present invention.

Before describing in detail the remotely controlled line conditioning apparatus in accordance with the present invention, it should be observed that the present invention resides primarily in a novel structural combination of conventional telecommunication circuits and components and not in the particular detailed configurations thereof Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a simplified example of a representative carrier telephone network with which the remotely controlled telephone line conditioning apparatus of the present invention is intended to be used. The network itself is shown as comprising a central office 10, which contains a central office terminal 12 and an associated central office switch 14 The central office may also include a direct access test unit 21, a pair gain applique 23 and a pair gain test controller 25, which are coupled via link 26 to a no test trunk 27 within the central office switch 14. As pointed out previously, direct access test unit or DATU 21 within the central office-resident host system preferably comprises a direct access test unit of the type described in U.S. Pat. No. 4,841,560, assigned to the assignee of the present application and the disclosure of which is herein incorporated. DATU 21 may be coupled through central office switch 14 by way of a conventional POTS ('plain old telephone system') link (e.g. copper wire) 31 to a channel unit 32 within central office terminal 12. Terminal 12 is also shown as including a channel unit 34. Each of channel units 32 and 34 is coupled by way of a multiplexer 36 to a central office/remote terminal link 41. Link 41 is not limited to any particular type of communication medium and may comprise, for example, conventional copper wire, a satellite link, radio link, or fiber optic cable.

The telephone network of FIG. 1 further includes a remote terminal 50, which is coupled to a plurality of telephone lines 52 through which user telephone devices 54 have access to the telephone system Like central office terminal 12, remote terminal 50 contains a multiplexer 56 coupled to central office/remote terminal communication link 41 and associated channel units 62, 64. As will be described in greater detail with reference to FIGS. 4 and 5, channel unit 64 is coupled to a multiport connection interface 60. This interface provides tip and ring connections to a line under test 52, and to tip and ring connections of test pair link 72. Channel unit 62 is coupled to a POTS line 66. POTS line 66 and DC test pair 72 are coupled to respective communication and line conditioning ports 82 and 84 of a telephone line conditioning apparatus 80 of the present invention (to be described more fully below with reference to FIGS. 2-5).

As pointed out briefly above, telephone line conditioning apparatus 80 operates in response to conditioning control messages forwarded to it from the DATU 21 at central office 10 to controllably condition a telephone line pair (e.g. line pair 54) exclusive of the use of a metallic DC bypass pair normally provided for the purpose. Such a normally provided DC bypass pair is not shown in FIG. 1 in order to underscore the communication and control mechanism through which the present invention operates to perform remote terminal conditioning of an associated line pair. Namely, although a metallic bypass pair from the central office to the (remote) terminal may be available, the presence and/or condition of such a metallic bypass pair does not affect the ability of the apparatus to condition the line under test.

Figure 2:
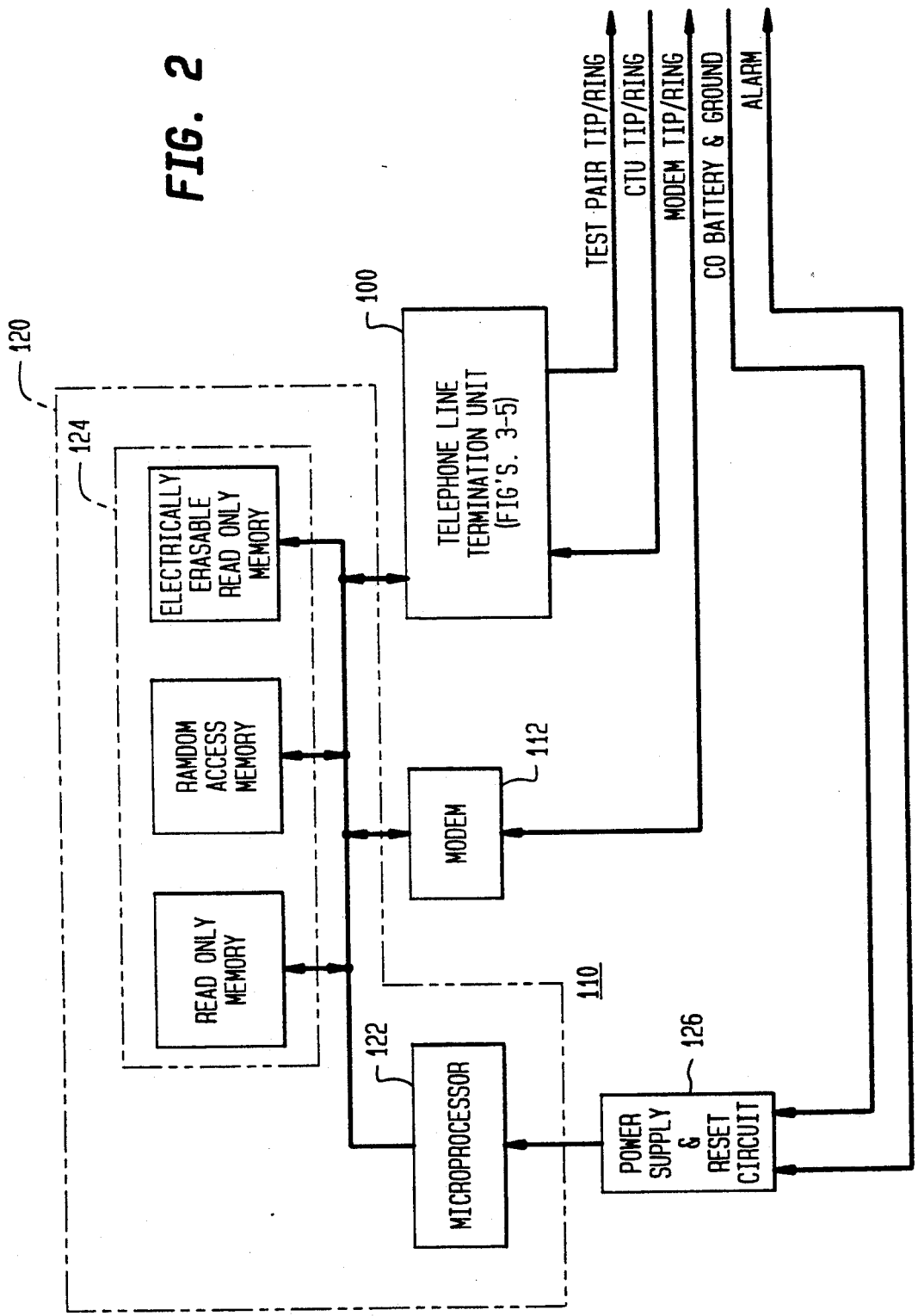
Figure 4:
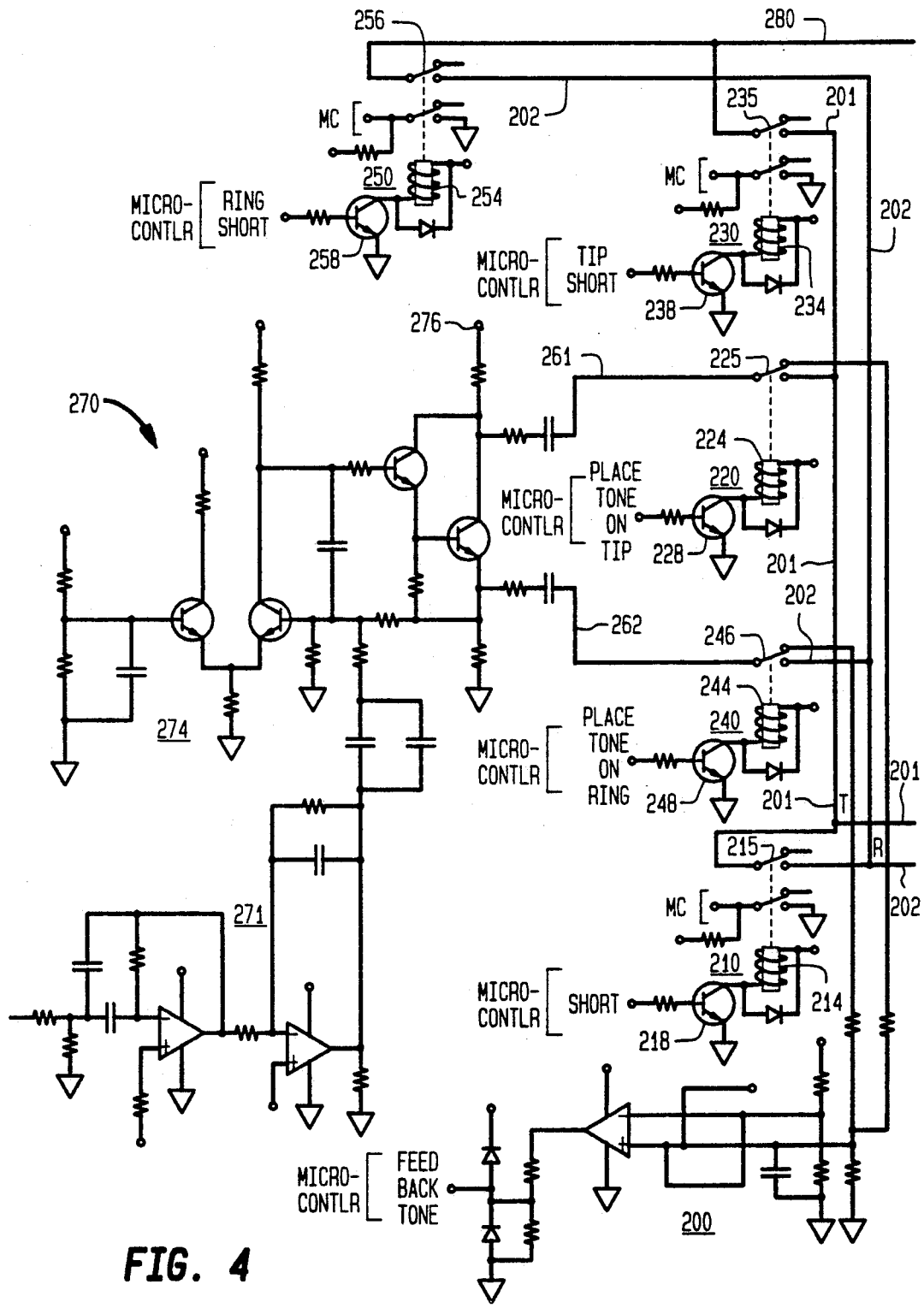
FIGS. 4 and 5, taken together, form a schematic illustration of line condition relay circuitry to which the line under test and a channel unit are ported.
Figure 5:
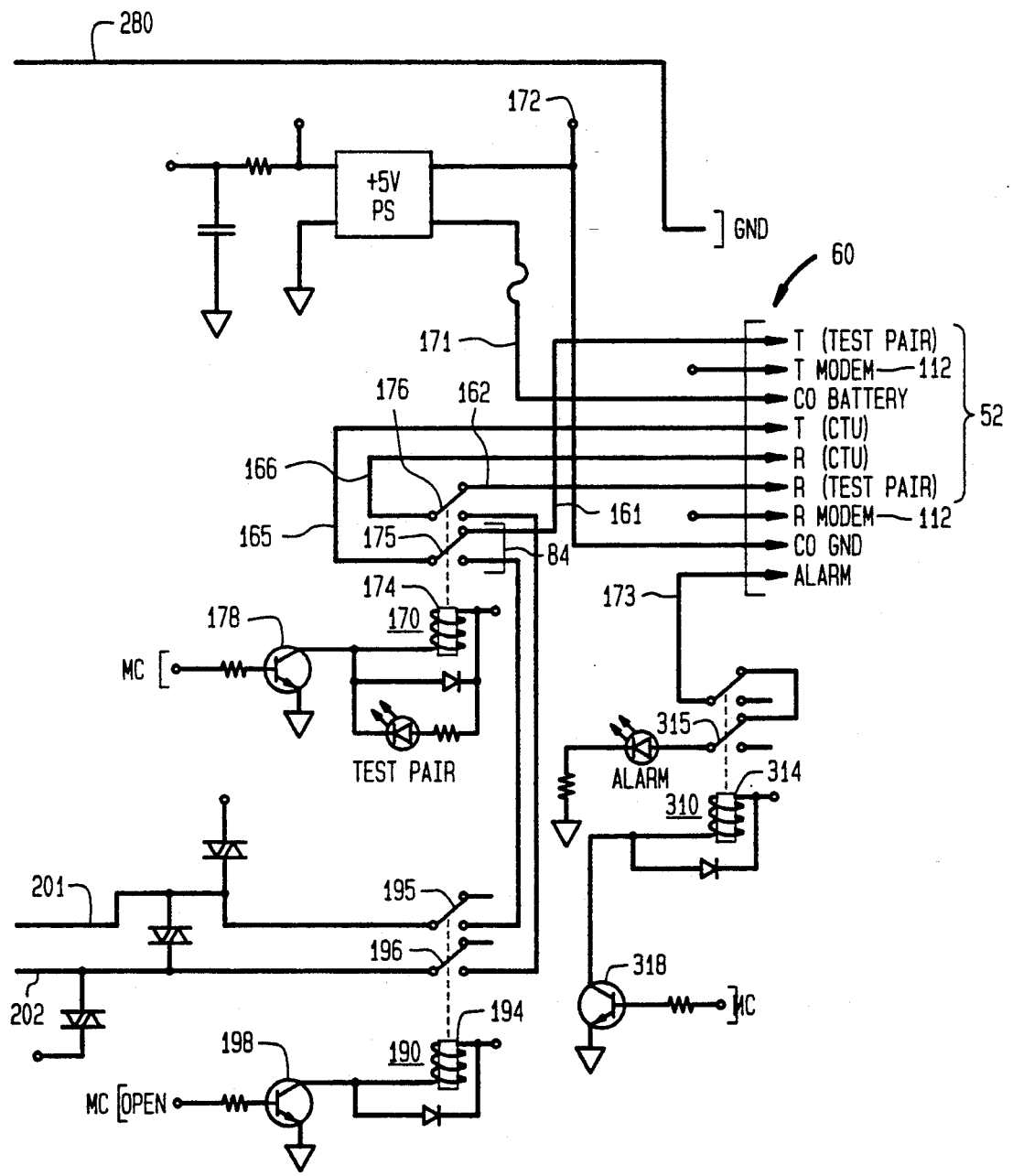

The telephone line conditioning apparatus of the present invention is diagrammatically shown in FIG. 2 as comprising a telephone line termination unit 100 and an intelligent control unit 110. Telephone line termination unit 100 has a telephone line access port 102 to which a telephone line test pair (e.g. test pair 72) is selectively coupled, and, as will be described in detail below with reference to FIGS. 4 and 5, is operative to controllably impart a selected one of a plurality of electrical signalling conditions to the telephone line pair 72 under test Control unit 110 includes a communication modem 112 through which communication signals containing telephone line conditioning messages are coupled via link 66 to the remote terminal channel unit 62 which, in turn, is coupled by way of multiplexer 56 with central office/remote terminal communication link 41. Control unit 110 also includes a micro-controller 120, which is comprised of a microprocessor 122, attendant memory 124, and is coupled with associated power supply and reset circuitry 126, and an intra control unit bus 116 to modem 112. As will be explained more fully below, in response to line conditioning messages from the host unit (DATU) located at the central office, micro-controller 120 generates telephone line termination unit control signals for controlling the operation of the telephone line termination unit which conditions the telephone line pair. Micro-controller 120 is driven by supervisory monitor and control software in memory 124. Rather than detail the application program, a code listing of which is not necessary for an understanding of the present invention, the manner in which the control program controls the operation of the line conditioning apparatus, in particular, line termination unit 100, will be described below in terms of actually monitored node activity states and control signals that are asserted by the micro-controller in response to those states.

Figure 3:
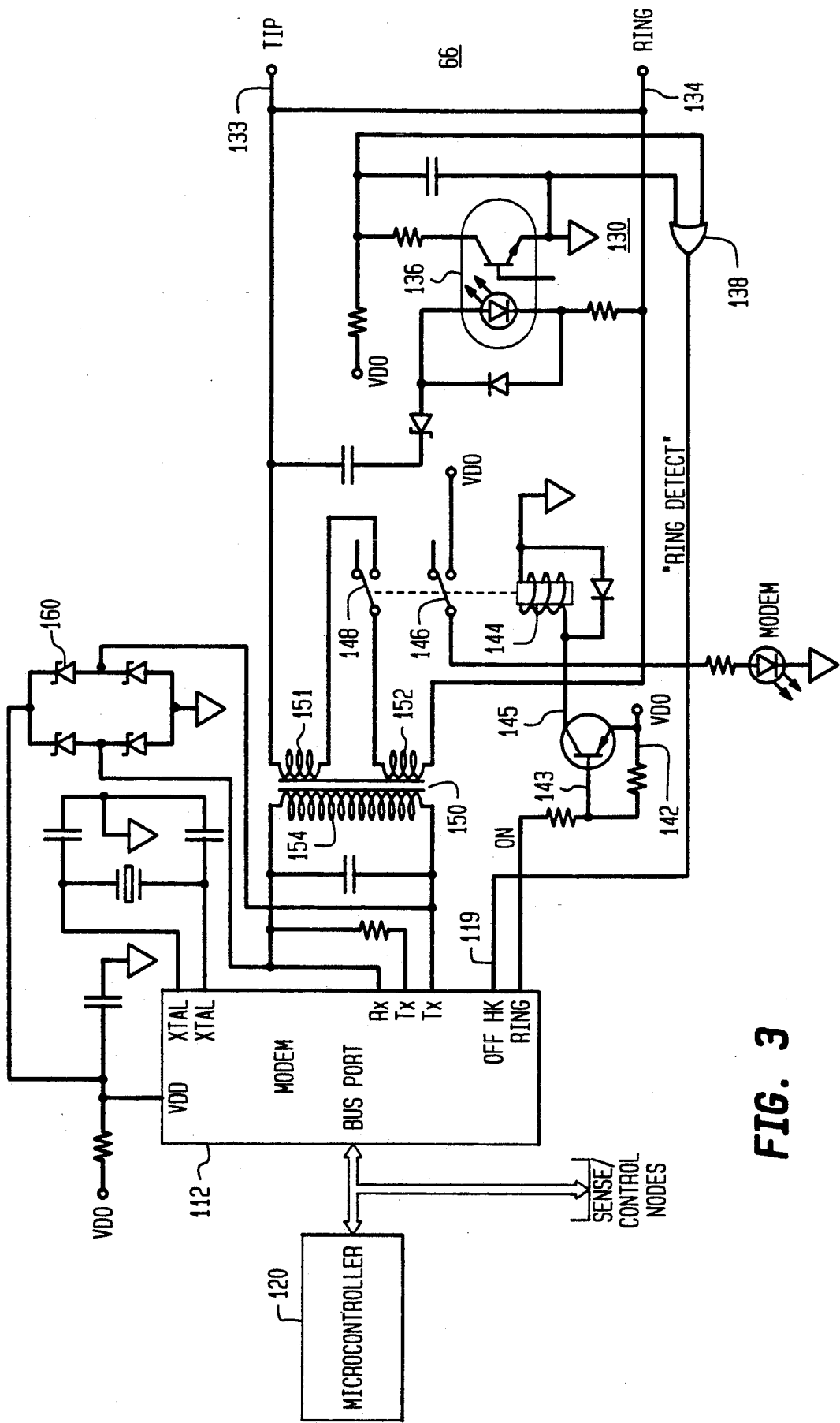
FIG. 3 schematically illustrates the circuitry of the modem, ring detect, off-hook interface between the line conditioning apparatus and a channel unit in the remote terminal.

Telephone line termination unit 100 contains a plurality of switching devices (relays) and associated input/output driver circuits which are coupled to receive respectively different telephone line condition-representative inputs, and are controlled by control signals from micro-controller 120, in order to impart a selected telephone line condition to the telephone line pair under test. The selected telephone line condition may involve a variety of actions, including but not limited to the application of prescribed voltages to the telephone line pair, the application of predetermined tone signals to either or both lines of the telephone line pair, shorting the telephone line pair together, shorting either or both sides of the line to ground potential, opening the telephone line pair, and the monitoring of the telephone line pair for the presence of voice or data activity FIG. 3 schematically illustrates the manner in which modem 112 is interfaced with a link 66, including the detection of ringing signal from channel unit 62 in the remote terminal, and providing modem coupling to link 66 in response to detecting an off-hook state from the modem. For incoming calls, a ring detector 130 includes an electro optic coupler unit 132 comprised of a light emitting diode coupled across the Tip 133 and Ring 134 portions of link 66 and a phototransistor 136, the collector and emitter of which are coupled to a ring detect OR gate 138. The output of gate 138 is coupled to a 'Ring' input of modem 112. The presence of a ringing signal on link 66 causes the emitter voltage of phototransistor 36 to go low, whereby OR gate 138 supplies a low, Ring Detect output to modem 112.

For outgoing calls, an Off-Hook detector is comprised of driver transistor 142, the base 143 of which is coupled to an output 'off hook (OH)' port 119 of modem 112 and the collector 145 output of which is coupled to the winding of relay 144. Relay 144 has a first set of contacts 146 coupled in circuit with an LED indicator 147 and a second set of contacts coupled in circuit with first and second primary coils 151, 152 of a coupling transformer 150. The secondary coil 154 of coupling transformer 150 is coupled to respective tip and ring ports of modem 112. When modem 112 forces off hook output 119 low, transistor 142 is turned on, thereby energizing relay 144 and providing a transformer coupling of the tip and ring leads of link 66 through the series-connected primary coils 151 and 152. Also included in the modem-to-telephone link interface are a Zener diode bridge 160 which serves to clamp perturbations at the tip and ring ports of the modem, and reverse-parallel connected Zener diodes across Tip and Ring for overvoltage protection.

FIGS. 4 and 5, taken together, form a schematic illustration of the arrangement of and interconnection of a plurality of switching devices (relays) resident within telephone line termination unit 100, and which operate in response to control signals from micro-controller 120 for imparting a selected telephone line condition to the telephone line pair under test. The multiport connection interface 60 of FIG. 1 is shown in detail as including respective tip and ring ports 161 and 162 coupled to the tip and ring portions of test pair line 52 (the line under test) to device 54. It also includes tip and ring ports 165, 166, which are coupled to the tip and ring portions of link 65 to channel unit 64. Multiport connection interface 60 also includes central office battery and ground ports 171 and 172 and an alarm port 173.

Line conditioning tip and ring ports 165, 166 are normally coupled through switch contacts 175, 176 of a CHANNEL UNIT DISCONNECT relay 170 to the respective tip and ring ports 161, 162, so that the line under test is normally coupled via link 65 to channel unit 64. When a winding 174 of CHANNEL UNIT DISCONNECT relay 170 is controllably energized, switch contacts 175, 176 couple tip and ring ports 161, 162 to respective tip and ring ports 165, 166, so that the line under test is disconnected from channel unit 64. Relay winding 174 is coupled in circuit with the collector-emitter path of a control transistor 178, the base of which is coupled to receive a channel unit disconnect control signal from micro-controller 120. Switch contacts 175, 176 of winding 174 are further coupled to tip and ring portions 181, 182 of link 72 and form line conditioning port 84.

Tip and ring portions 181, 182 of link 72 extend to relay contacts 185, 186 of an ENABLE TEST relay 190. Relay 190 has a winding 194 which is coupled in circuit with the collector-emitter path of a control transistor 198, the base of which is coupled to receive an enable test control signal from micro-controller 120. Switch contacts 195, 196 of relay 190 are coupled to links 201, 202, respectively. Links 201 and 202 are coupled to opposite sides of relay contacts 215 of a SHORT TIP AND RING relay 210. Lead 201 is further coupled to a first side of each of relay contacts 225 and 226 of a TONE ON TIP relay 220 and on side of relay contacts 235 of a GROUND ON TIP relay 230, respectively Lead 202 is further coupled to one side of relay contacts 246 of a TONE ON RING relay 240 and to one side of a contacts 256 of a GROUND ON RING relay 250.

Relay 210 has a winding 214 which is coupled in circuit with the collector-emitter path of a control transistor 218, the base of which is coupled to receive a 'short tip and ring' representative control signal from micro-controller 120. TONE ON TIP Relay 220 has a winding 224 which is coupled in circuit with the collector-emitter path of a control transistor 228, the base of which is coupled to receive a 'place tone on tip' representative control signal from micro-controller 120 GROUND ON TIP Relay 230 has a winding 234 which is coupled in circuit with the collector-emitter path of a control transistor 238, the base of which is coupled to receive a 'put ground on tip' representative control signal from micro-controller 120. TONE ON RING Relay 240 has a winding 244 which is coupled in circuit with the collector-emitter path of a control transistor 248, the base of which is coupled to receive a 'place tone on ring' representative control signal from microcontroller 120. Relay 20 has a winding 254 which is coupled in circuit with the collector-emitter path of a control transistor 258, the base of which is coupled to receive a 'place ground on ring' representative control signal from micro-controller 120.

A second side of relay contacts 225 of TONE ON TIP relay 220 is coupled via link 261 to a tone generator 270. Similarly, a second side of relay contacts 246 of TONE ON RING relay 240 is coupled via link 262 to tone generator 270. A second side of relay contacts 235 of GROUND ON TIP relay 230 and relay contacts 255 of GROUND ON RING relay 250 are each coupled to a GROUND link 280.

Tone generator 270 is comprised of a bandpass filter stage 271 having a prescribed center frequency (e.g. 577 Hz) to which a synthesized tone from micro-controller 120 is supplied. The output of filter stage 271 is coupled to one side of a differential amplifier stage 274. A voltage divider reference is coupled to the other side of differential amplifier stage 274. A phase splitter 276 is coupled to the output of differential amplifier stage 274 and places respective tone signals on tip link 261 and ring link 262. A second set of contacts 235 and 246 of relays 230 and 240, respectively are coupled to a tone termination circuit 200, the output of which is monitored by micro-controller 120.

LINE CONDITIONING

As noted earlier, the respective relays of the line termination unit are operated by micro-controller 120 in accordance with respectively different telephone line condition-representative control, so as to impart a selected telephone line condition to the telephone line pair under test. With the relay arrangement of FIGS. 4 and 5, a number of different line conditioning actions, are available, including the application of prescribed voltages (battery and ground) to the telephone line pair, the application of predetermined tone signals to either or both lines of the telephone line pair, shorting the telephone line pair together, opening the telephone line pair, and the monitoring of the telephone line pair for the presence of voice or data activity.

CHANNEL UNIT DISCONNECT (OPEN)

As described briefly above, line conditioning tip and ring ports 165, 166 are normally coupled through switch contacts 175, 176 of a CHANNEL UNIT DISCONNECT relay 170 to the respective tip and ring ports 161, 162, so that the line under test is normally coupled via link 65 to channel unit 64. In order to open this connection, and thereby disconnect the line pair 52 from channel unit 64, micro-controller 120 pulls the base of control transistor 198 low, thereby energizing winding 174 of CHANNEL UNIT DISCONNECT relay 170. As a consequence, switch contacts 175, 176 couple ring and tip ports 161, 162 to respective tip and ring ports 165, 166, thereby disconnecting the line under test from channel unit 64. Since switch contacts 175, 176 of winding 174 are further coupled to open tip and ring portions 181, 182 of link 72 (ENABLE TEST relay 190 is currently deenergized), the disconnect control signal effectively places an open circuit on each of tip and ring portions 165 and 166 of the channel unit line 65.

SHORT TIP AND RING

To short tip to ring, micro-controller operates each of relays 170 and 190, thereby connecting the line under test to tip and ring lines 201 and 202, respectively SHORT TIP TO RING relay 210 is also energized, which closes contacts 215 and thereby shorts lines 210 and 202 together.

SHORT TO GROUND

For this function, the remotely controlled line conditioning apparatus activates the tip or ring relay and activates a tip-to-ground relay. In a short to ground condition, each of the tip and ring lines are shorted to ground. Again, micro-controller operates each of relays 170 and 190, thereby connecting the line under test to tip and ring lines 201 and 202, respectively, and SHORT TIP TO RING relay 210 is energized, which closes contacts 215 and thereby shorts lines 210 and 202 together In addition, relay 210 (or alternatively relay 250) is energized by micro-controller 120, so as to couple the ground potential on line 280 to the shorted lines

APPLY GROUND TO TIP

Again, micro-controller operates each of relays 170 and 190, thereby connecting the line under test to tip and ring lines 201 and 202, respectively. GROUND ON TIP relay 230 is also energized, so as to close contacts 235 and couple the ground potential on line 280 to tip lead 201. Ring lead 202 remains open by the normally open contact 215 of relay 210.

APPLY GROUND TO RING

Micro-controller 120 operates each of relays 170 and 190, thereby connecting the line under test to tip and ring lines 201 and 202, respectively. GROUND ON RING relay 250 is also energized, so as to close contacts 256 and couple the ground potential on line 280 to ring lead 202. Tip lead 201 remains open by the normally open contact 215 of relay 210.

TIP-RING TONE

A tone test may be selectively invoked for either tip and ring, or for both leads together. For any of these applications, the test tone (577 Hz) is synthesized by micro-controller 120 and applied through tone generator stage 270 to each of leads 261 and 262. Depending upon the choice of line or lines to which the tone is to be applied micro-controller 120. Micro-controller 120 operates each of relays 170 and 190, thereby connecting the line under test to tip and ring lines 201 and 202, respectively. It also energizes a selected one or both of relays 220 and 240, thereby coupling the 577 Hz tone to one or both of ports 161, 162.

ALARM SIGNALLING

In addition to controllably performing a number of test conditions, the telephone line conditioning apparatus of the present invention is also equipped to provide an external alarm in the event of a system failure. For this purpose an ALARM relay 310 has a winding 314 which is coupled in circuit with the collector-emitter path of a control transistor 318, the base of which is coupled to receive an 'alarm condition' representative control signal from micro-controller 120. Alarm relay has relay contacts 315 coupled in circuit with an ALARM port of interface 60 and a prescribed alarm condition representative signalling circuit, as shown.

As will be appreciated from the foregoing description, because the telephone line conditioning apparatus of the present invention is a self-contained, microprocessor based, modem equipped unit, it is able to communicate with the host system, and can thereby perform a number of different software-driven operations in response to line conditioning control messages sourced from the central office. It should be noted that the communication protocol employed may be any of those customarily used in digital telecommunications networks Also, the conditioning operations performed are not limited as to duration or any particular sequence.

Thus, for example, the telephone line conditioning apparatus of the present invention may be controlled by the user of the host equipment, so as to maintain the line conditioning function for an extended period of time; then, after the connection between the host and the remote terminal has been released, the line conditioning apparatus may perform additional conditioning of the line pair and make its modem access port available for further messages from the host. Also, while maintaining the line conditioning function, the telephone line conditioning apparatus may be accessed by the host and allow any line conditioning function to be performed including cancellation of the specific conditioning function being maintained. Moreover, the control software may include additional functionality, such as a verification test that may be carried out each time a line conditioning function is invoked, in order to assess the apparatus' current capacity to provide the specified conditioning function. The operational control software resident within micro-controller 120 may also provide the user with the most current information on the state of the line under test, and allow user-requested, on-line diagnostic functions to be employed in order to verify system integrity.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone system including a central office which communicates with a remote terminal by way of a central office/remote terminal communication link, the remote terminal being coupled to respective telephone lines through which user telephone devices have access to the telephone system, an apparatus for conditioning a respective telephone line by way of a telephone line conditioning control unit at the central office comprising:
   a telephone line termination unit having a telephone line access port to which a telephone line pair may be coupled, said telephone line termination unit including means for controllably imparting a selected one of a plurality of electrical signalling conditions by way of said telephone line access port to a telephone line pair coupled thereto; and
   a control unit, coupled to said telephone line termination unit and said central office/remote terminal communication link, for receiving telephone line conditioning messages from said central office and controlling the operation of said telephone line termination unit.

2. An apparatus according to claim 1, wherein said telephone line termination unit comprises a telephone line condition selection circuit, responsive to control signals from said control unit, for imparting selected electrical conditions to said telephone line access port and thereby to a telephone line pair coupled thereto.

3. An apparatus according to claim 2, wherein said selected electrical conditions include the application of prescribed Voltages to said telephone line pair and the application of predetermined tone signals to either or both lines of said telephone line pair.

4. An apparatus according to claim 3, wherein said selected electrical conditions include shorting said telephone line pair together, shorting either or both sides of the line to ground potential, opening said telephone line pair, and the monitoring of said telephone line pair for the presence of voice or data activity thereon.

5. For use with a telephone system including a central office which communicates with a remote terminal by way of a central office/remote terminal communication link, the remote terminal being coupled to respective telephone lines through which user telephone devices have access to the telephone system, and wherein said system includes a DC bypass pair through which said central office is also connected to said remote terminal, an apparatus for conditioning a respective one of said telephone lines comprising:
   a telephone line termination unit having a telephone line access port to which a telephone line pair may be coupled, said telephone line termination unit including means for controllably imparting a selected one of a plurality of electrical signalling conditions by way of said telephone line access port to a telephone line pair coupled thereto; and
   a control unit, coupled to said telephone line termination unit and said central office/remote terminal communication link, for receiving telephone line conditioning messages from said central office and controlling the operation of said telephone line termination unit and thereby the conditioning of said telephone line pair, exclusive of said DC bypass pair.

6. An apparatus according to claim 5, wherein said telephone line termination unit comprises a telephone line condition selection circuit, responsive to control signals from said control unit, for imparting selected electrical conditions to said telephone line access port and thereby to a telephone line pair coupled thereto.

7. An apparatus according to claim 6, wherein said selected electrical conditions include the application of prescribed voltages to said telephone line pair and the application of predetermined tone signals to either or both lines of said telephone line pair.

8. An apparatus according to claim 7, wherein said selected electrical conditions include shorting said telephone line pair together, shorting either or both sides of the line to ground potential, opening said telephone line pair, and the monitoring of said telephone line pair for the presence of voice or data activity thereon.

9. For use with a telephone system including a central office which communicates with a remote terminal by way of a central office/remote terminal communication link, the remote terminal being coupled to telephone line pairs through which user telephone devices have access to the telephone system, an apparatus, provided at said remote terminal, for enabling a selected one of said telephone line pairs to be conditioned from said central office comprising:
   a telephone line termination unit having a telephone line access port to which a telephone line pair may be selectively coupled, said telephone line termination unit including means for controllably imparting a selected one of a plurality of electrical signalling conditions by way of said telephone line access port to a telephone line pair coupled thereto; and
   a control unit having a communication port coupled to said central office/remote terminal communication link for receiving a telephone line conditioning message from said central office, and a control link coupled to said telephone line termination unit for supplying telephone line unit control signals for controlling the operation of said telephone line termination unit and thereby the conditioning of said telephone line pair, in accordance with the contents of a telephone line conditioning message from said central office.

10. An apparatus according to claim 9, wherein said control unit comprises a communication modem coupled to said communication port and through which communication signals containing telephone line conditioning messages are coupled to and from said central office/remote terminal communication link, and a control processor, coupled to said modem, for generating said telephone line unit control signals for controlling the operation of said telephone line termination unit and thereby the conditioning of said telephone line pair in accordance with the contents of a telephone line conditioning message conveyed in communication signals carried by said central office/remote terminal communication link from said central office.

11. An apparatus according to claim 10, wherein said telephone line termination unit comprises a telephone line condition selection circuit which imparts a selected telephone line condition to said telephone line access port, and thereby to a respective telephone line pair, in accordance with control signals generated by said control processor.

12. An apparatus according to claim 11, wherein said telephone line condition selection circuit comprises a plurality of switching devices coupled to receive respectively different telephone line condition-representative inputs, said switching devices being selectively controlled by control signals from said control processor to impart a selected telephone line condition to a respective telephone line pair.

13. An apparatus according to claim 12, wherein a selected telephone line condition includes the application of prescribed voltages to said telephone line pair and the application of predetermined tone signals to either or both lines of said telephone line pair.

14. An apparatus according to claim 13, wherein a selected telephone line condition includes shorting said telephone line pair together, shorting either or both sides of the line to ground potential, opening said telephone line pair, and the monitoring of said telephone line pair for the presence of voice or data activity thereon.

15. For use with a telephone system including a central office which communicates with a remote terminal by way of a central office/remote terminal communication link, the remote terminal being coupled to telephone line pairs through which user telephone devices have access to the telephone system, a method for enabling a selected one of said telephone line pairs to be conditioned from said central office comprising the steps of:

(a) installing in said remote terminal a telephone line conditioning apparatus, which includes a telephone line termination unit having a telephone line access port to which a telephone line pair may be selectively coupled, and being operative to controllably impart a selected one of a plurality of electrical signalling conditions by way of said telephone line access port to a telephone line pair coupled thereto, and a control unit having a communication port coupled to said central office/remote terminal communication link for receiving a telephone line conditioning message from said central office, and a control link coupled to said telephone line termination unit for supplying telephone line unit control signals for controlling the operation of said telephone line termination unit and thereby the conditioning of said telephone line pair, in accordance with the contents of a telephone line conditioning message from said central office; and (b) transmitting a telephone line conditioning message from said central office by way of said central office/remote terminal communication link to said control unit, in response to which message said control unit outputs telephone line unit control signals for controlling the operation of said telephone line termination unit and thereby the conditioning of said telephone line pair.

16. A method according to claim 15, wherein said control unit comprises a communication modem coupled to said communication port and receiving therethrough said telephone line conditioning message transmitted from said central office, and a control processor, coupled to said modem, for generating said telephone line unit control signals for controlling the operation of said telephone line termination unit and thereby the conditioning of said telephone line pair in accordance with the contents of said telephone line conditioning message.

17. A method according to claim 15, wherein said telephone line conditioning apparatus comprises a telephone line condition selection circuit which imparts a selected telephone line condition to said telephone line access port, and thereby to a respective telephone line pair, in accordance with control signals output by said control processor in step (b).

18. A method according to claim 17, wherein said telephone line condition selection circuit comprises a plurality of switching devices coupled to receive respectively different telephone line condition-representative inputs, said switching devices being selectively controlled by control signals output from said control processor in step (b) to impart a selected telephone line condition to a respective telephone line pair.

19. A method according to claim 18, wherein a selected telephone line condition includes the application of prescribed voltages to said telephone line pair, the application of predetermined tone signals to either or both lines of said telephone line pair, shorting said telephone line pair together, shorting either or both sides of the line to ground potential, opening said telephone line pair, and the monitoring of said telephone line pair for the presence of voice or data activity thereon.

* * * * *